(12) United States Patent
Aktas et al.

(10) Patent No.: US 11,729,648 B2
(45) Date of Patent: Aug. 15, 2023

(54) RESOURCE AVAILABILITY INFORMATION REPORTING AND UTILIZATION

(71) Applicant: QUALCOMM Incorporated, San Diego, CA (US)

(72) Inventors: Tugcan Aktas, La Jolla, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 17/302,666

(22) Filed: May 10, 2021

(65) Prior Publication Data

US 2022/0150733 A1  May 12, 2022

Related U.S. Application Data

(60) Provisional application No. 63/198,713, filed on Nov. 6, 2020.

(51) Int. Cl.
*H04W 24/08* (2009.01)
*H04L 5/00* (2006.01)
*H04L 1/00* (2006.01)

(52) U.S. Cl.
CPC ............ *H04W 24/08* (2013.01); *H04L 1/003* (2013.01); *H04L 5/0048* (2013.01)

(58) Field of Classification Search
CPC . H04W 24/08; H04W 76/14; H04W 72/1236; H04W 92/20; H04W 72/0453; H04W 56/001; H04L 1/003; H04L 5/0048; H04L 5/0053; H04L 5/0094; H04L 41/0803; H04B 7/0634
See application file for complete search history.

(56) References Cited

U.S. PATENT DOCUMENTS

| | | | |
|---|---|---|---|
| 2015/0334760 A1 | 11/2015 | Sartori et al. | |
| 2017/0230165 A1* | 8/2017 | Yang | H04W 76/14 |
| 2017/0280344 A1* | 9/2017 | Siomina | H04L 41/0803 |
| 2020/0351964 A1* | 11/2020 | Wu | H04W 72/543 |
| 2021/0168632 A1* | 6/2021 | Lee | H04W 4/40 |
| 2022/0132486 A1 | 4/2022 | Aktas et al. | |

(Continued)

FOREIGN PATENT DOCUMENTS

| | | | | |
|---|---|---|---|---|
| EP | 3629644 A1 | 4/2020 | | |
| JP | 2022528248 A * | 4/2019 | ........ | H04W 72/0406 |

(Continued)

OTHER PUBLICATIONS

International Search Report and Written Opinion—PCT/US2021/071381—ISA/EPO—dated Jan. 4, 2022.

*Primary Examiner* — Ayaz R Sheikh
*Assistant Examiner* — Louis Samara
(74) *Attorney, Agent, or Firm* — Harrity & Harrity, LLP

(57) ABSTRACT

Various aspects of the present disclosure generally relate to wireless communication. In some aspects, a first user equipment (UE) may monitor a set of resources to determine a set of availability statuses for the set of resources. The UE may transmit, to a second UE, resource availability information including, for each resource of a set of resources, a respective plurality of bits indicating an availability status of the set of availability statuses. Numerous other aspects are provided.

30 Claims, 9 Drawing Sheets

(56) References Cited

U.S. PATENT DOCUMENTS

| | | | |
|---|---|---|---|
| 2022/0182120 A1* | 6/2022 | Sergeev | H04B 7/0634 |
| 2022/0295456 A1* | 9/2022 | Liu | H04W 92/20 |
| 2022/0295560 A1* | 9/2022 | Shokri Razaghi | H04W 72/0453 |

FOREIGN PATENT DOCUMENTS

| | | | | |
|---|---|---|---|---|
| JP | 2022528248 A * | 3/2020 | | H04W 56/001 |
| WO | WO-2012094151 A2 * | 7/2012 | | H04B 7/0689 |
| WO | WO-2015162635 A1 * | 10/2015 | | H04L 45/02 |
| WO | 2020198760 A2 | 10/2020 | | |
| WO | WO-2021062835 A1 * | 4/2021 | | |

\* cited by examiner

RESOURCE AVAILABILITY INFORMATION REPORTING AND UTILIZATION

CROSS-REFERENCE TO RELATED APPLICATION

This patent application claims priority to U.S. Provisional Patent Application No. 63/198,713, filed on Nov. 6, 2020, entitled "RESOURCE AVAILABILITY INFORMATION REPORTING AND UTILIZATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for resource availability information reporting and utilization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and the "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes monitoring a set of resources to determine a set of availability statuses for the set of resources; and transmitting, to a second UE, resource availability information including, for each resource of a set of resources, a respective plurality of bits indicating an availability status of the set of availability statuses.

In some aspects, a method of wireless communication performed by a second UE includes receiving, from a first UE, resource availability information including, for each resource of a set of resources, a respective plurality of bits indicating an availability status of a set of availability statuses; and transmitting, to the first UE and based at least in part on receiving the resource availability information from the first UE, a communication that uses at least one of the set of resources.

In some aspects, a first UE for wireless communication includes a memory and one or more processors coupled to the memory, the one or more processors configured to: monitor a set of resources to determine a set of availability statuses for the set of resources; and transmit, to a second UE, resource availability information including, for each resource of a set of resources, a respective plurality of bits indicating an availability status of the set of availability statuses.

In some aspects, a second UE for wireless communication includes a memory and one or more processors coupled to the memory, the one or more processors configured to: receive, from a first UE, resource availability information including, for each resource of a set of resources, a respective plurality of bits indicating an availability status of a set of availability statuses; and transmit, to the first UE and based at least in part on receiving the resource availability information from the first UE, a communication that uses at least one of the set of resources.

In some aspects, a non-transitory computer-readable medium storing a set of instructions for wireless communication includes one or more instructions that, when executed by one or more processors of a first UE, cause the first UE to: monitor a set of resources to determine a set of availability statuses for the set of resources; and transmit, to a second UE, resource availability information including, for each resource of a set of resources, a respective plurality of bits indicating an availability status of the set of availability statuses.

In some aspects, a non-transitory computer-readable medium storing a set of instructions for wireless communication includes one or more instructions that, when executed by one or more processors of a second UE, cause the second UE to: receive, from a first UE, resource availability information including, for each resource of a set of resources, a respective plurality of bits indicating an availability status of a set of availability statuses; and transmit, to the first UE and based at least in part on receiving the resource availability information from the first UE, a communication that uses at least one of the set of resources.

In some aspects, a first apparatus for wireless communication includes means for monitoring a set of resources to determine a set of availability statuses for the set of resources; and means for transmitting, to a second apparatus, resource availability information including, for each resource of a set of resources, a respective plurality of bits indicating an availability status of the set of availability statuses.

In some aspects, an apparatus for wireless communication includes means for receiving, from a first apparatus, resource availability information including, for each resource of a set of resources, a respective plurality of bits indicating an availability status of a set of availability statuses; and means for transmitting, to the first apparatus and based at least in part on transmitting the resource availability information to the second apparatus, a communication that uses at least one of the set of resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
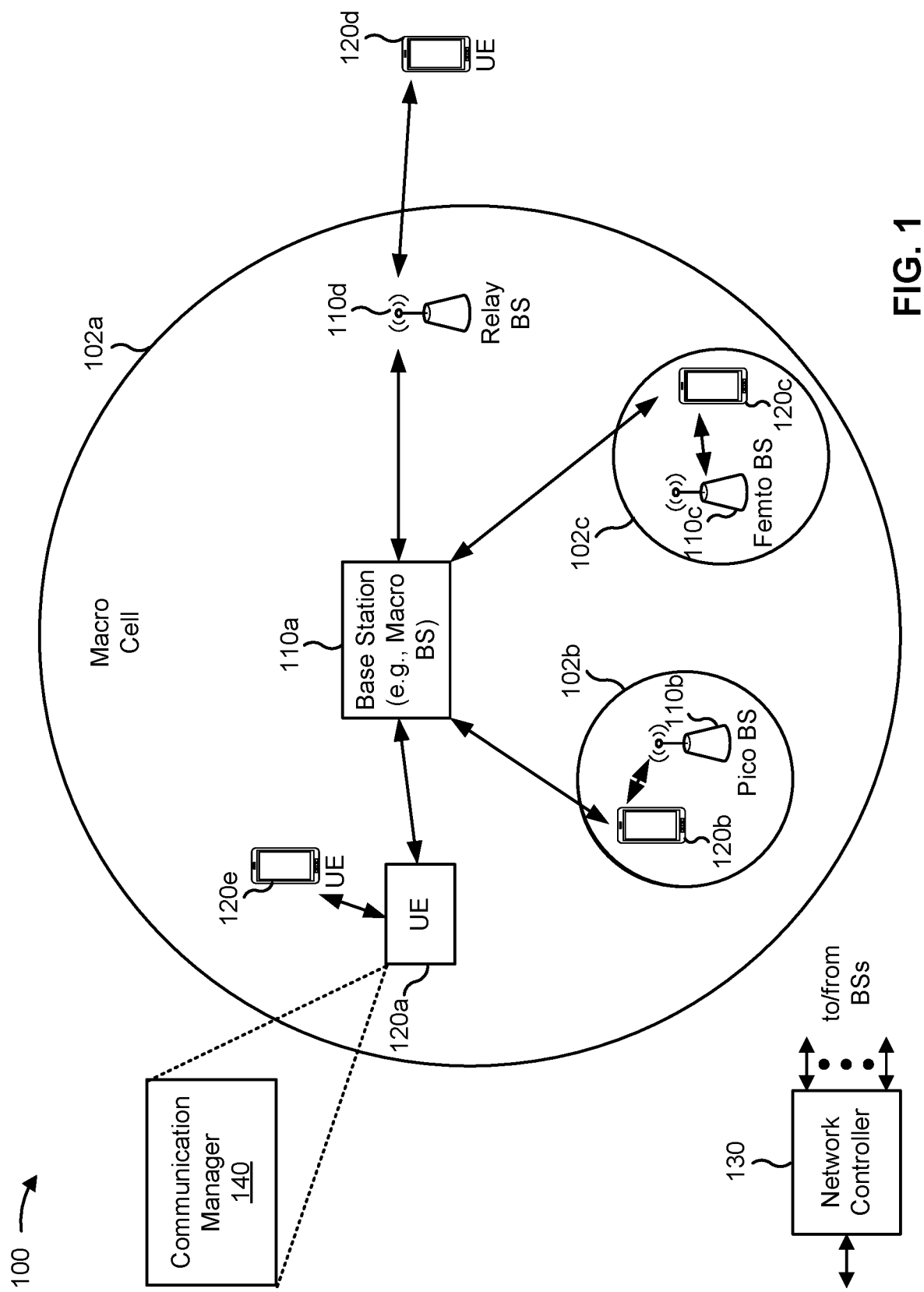
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the BS 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may monitor a set of resources to determine a set of availability statuses for the set of resources; and transmit, to another UE 120, resource availability information including, for each resource of a set of resources, a respective plurality of bits indicating an availability status of the set of availability statuses. As described in more detail elsewhere herein, the communication manager 140 may receive, from another UE 120, resource availability information including, for each resource of a set of resources, a respective plurality of bits indicating an availability status of a set of availability statuses; and transmit, to the other UE 120 and based at least in part on receiving the resource availability information from the other UE 120, a communication that uses at least one of the set of resources. Additionally, or alternatively, the communication manager 140 may perform one or more other operations described herein.

As indicated above, FIG. 1 is provided as an example. Other examples may differ from what is described with regard to FIG. 1.

Figure 2:
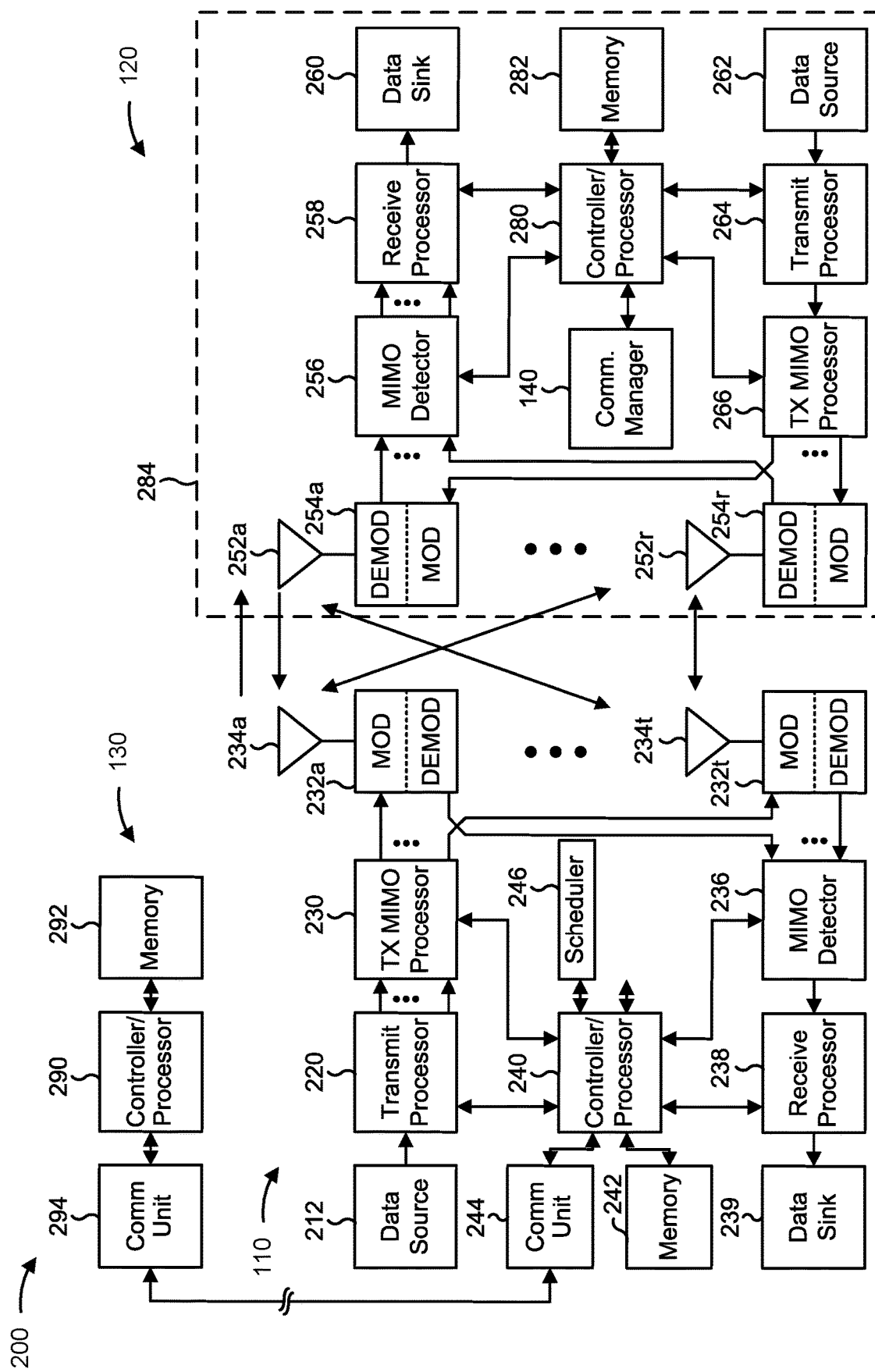
FIG. 2 is a diagram illustrating an example of a base station in communication with a user equipment (UE) in a wireless network, in accordance with the present disclosure.

FIG. 2 is a diagram illustrating an example 200 of a BS 110 in communication with a UE 120 in a wireless network 100, in accordance with the present disclosure. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with B S 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to BS 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-8.

At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. BS 110 may include a scheduler 246 to schedule UEs 120 for downlink and/or uplink communications. In some aspects, a modulator and a demodulator (e.g., MOD/DEMOD 232) of the BS 110 may be included in a modem of the BS 110. In some aspects, the BS 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-8.

Controller/processor 240 of BS 110, controller/processor 280 of UE 120, and/or any other component(s) of FIG. 2 may perform one or more techniques associated with resource availability information reporting and utilization, as described in more detail elsewhere herein. For example, controller/processor 240 of BS 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the BS 110 and/or the UE 120, may cause the one or more processors, the UE 120, and/or the BS 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a first UE includes means for monitoring a set of resources to determine a set of availability statuses for the set of resources; and/or means for transmitting, to a second UE, resource availability information including, for each resource of a set of resources, a respective plurality of bits indicating an availability status of the set of availability statuses. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a second UE includes means for receiving, from a first UE, resource availability information including, for each resource of a set of resources, a respective plurality of bits indicating an availability status of a set of availability statuses; and/or means for transmitting, to the first UE and based at least in part on receiving the resource availability information from the first UE, a communication that uses at least one of the set of resources. The means for the second UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
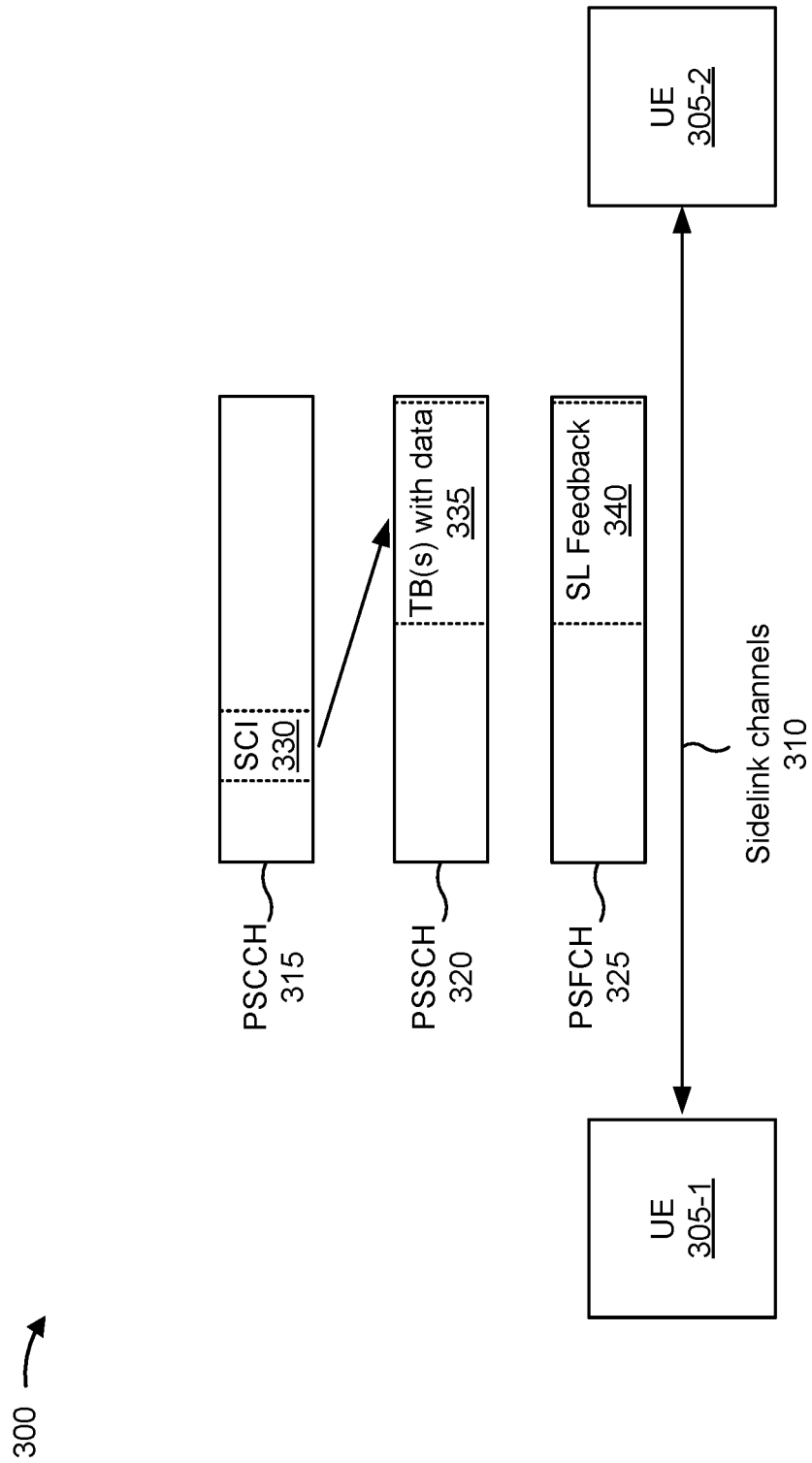
FIG. 3 is a diagram illustrating an example of sidelink communication, in accordance with the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle to pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a BS 110 via an access link or an access channel. The PSSCH 320 may be used to communicate data, similar to a physical downlink shared channel (PDSCH) and/or a physical uplink shared channel (PUSCH) used for cellular communications with a BS 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a BS 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
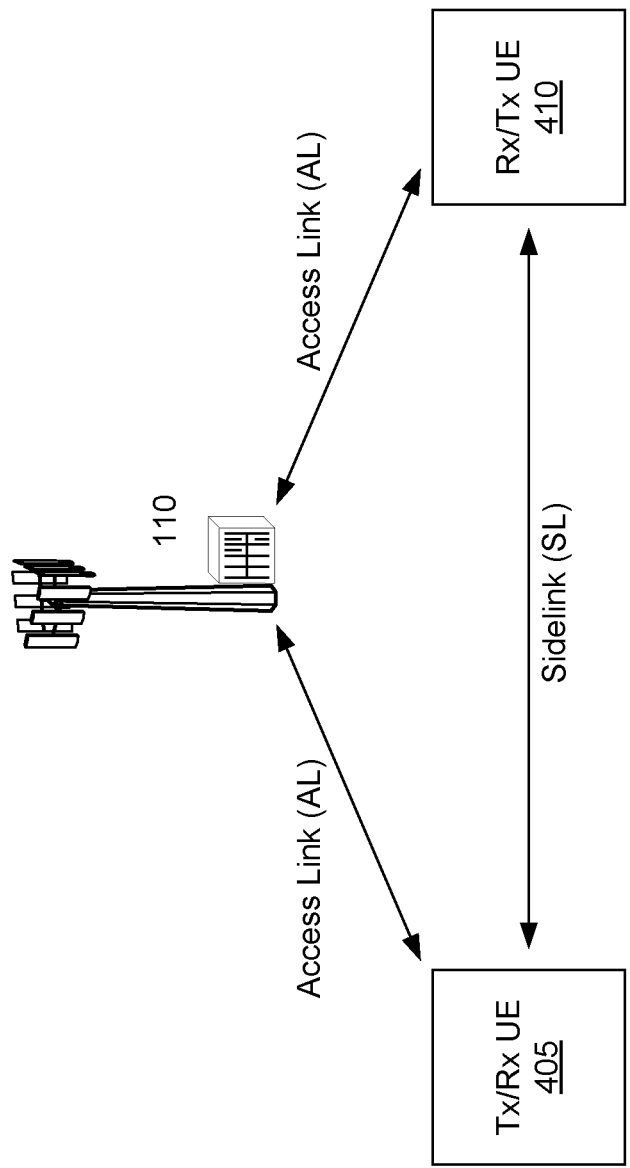
FIG. 4 is a diagram illustrating an example of sidelink communications and access link communications, in accordance with the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a BS 110 may communicate with the Tx/Rx UE 405 via a first access link. Additionally, or alternatively, in some sidelink modes, the BS 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a BS 110 and a UE 120 (e.g., via a Uu interface) may be referred to as an access link. Sidelink communications may be transmitted via the sidelink, and access link communications may be transmitted via the access link. An access link communication may be either a downlink communication (from a BS 110 to a UE 120) or an uplink communication (from a UE 120 to a BS 110).

As indicated above, FIG. 4 is provided as an example. Other examples may differ from what is described with respect to FIG. 4.

Figure 5:
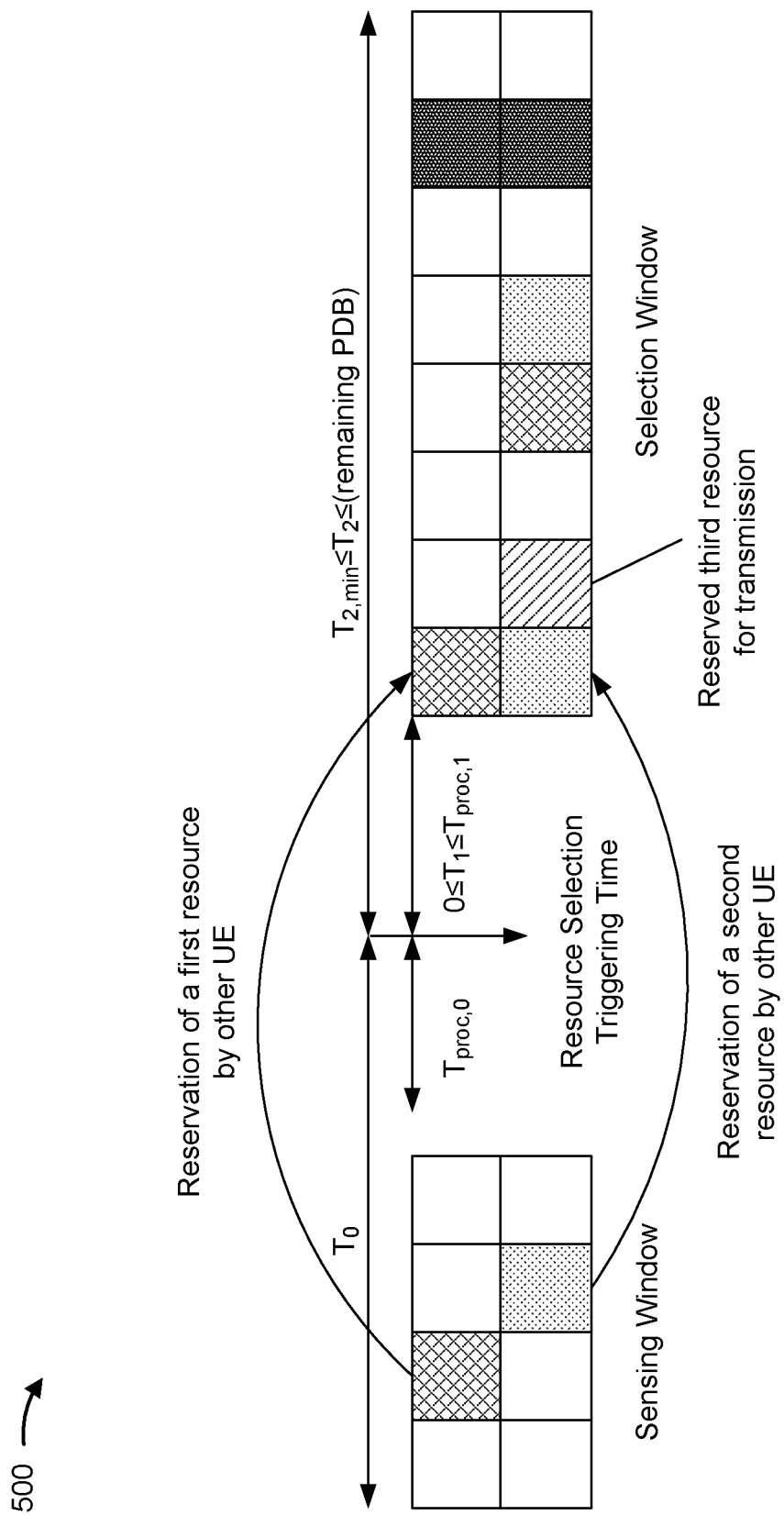
FIG. 5 is a diagram illustrating an example of resource availability sensing, in accordance with the present disclosure.

FIG. 5 is a diagram illustrating an example 500 of resource availability sensing, in accordance with various aspects of the present disclosure.

As shown in FIG. 5, a transmitting UE, that is to transmit to a receiving UE, may sense resources within a sliding sensing window. For example, the transmitting UE may sense, based at least in part on monitoring the sensing window, that a first resource and a second resource are reserved in a subsequent transmission window by other UEs (e.g., other than the transmitting UE). In this case, the transmitting UE may decode one or more SCI messages in the sensing window to identify reservations of the first resource and second resource. In some aspects, the transmitting UE may determine that the first resource and the second resource are reserved based at least in part on a detected received signal level of, for example, respective SCIs reserving the first resource and the second resource. In other words, if a received signal level of an SCI reserving the first resource satisfies a threshold, the transmitting UE may determine that communication using the first resource may result in interference with another transmission (e.g., by another UE) and may determine that the first resource is reserved. In contrast, if the received signal level does not satisfy the threshold (or if no SCI is received), the transmitting UE may determine that interference with another transmission is not predicted to occur, and may determine that the first resource is not reserved.

In some cases, the transmitting UE may measure a particular quantity to determine whether a resource is reserved. For example, the transmitting UE may measure an RSRP level on a PSSCH or a PSSCH, as described above. For example, the transmitting UE may compare a measured RSRP to an RSRP threshold (e.g., that is configured based at least in part on a first priority of the transmitting UE and/or a second priority of the receive UE). However, some transmitting UEs may have limited resources for performing resource availability sensing. For example, a transmitting UE may have limited power resources.

In this case, a receiving UE may perform resource availability sensing and may provide a report of availability information to the transmitting UE via a unicast or groupcast communication. In this case, the receiving UE may transmit a binary report indicating whether a resource is identified as available or not available by the receiving UE. When the receiving UE determines whether a resource is available, the receiving UE may use information regarding interference levels. For example, the receiving UE may measure a first RSRP of a first transmission from the transmitting UE and a second RSRP of a second transmission from an interfering UE (e.g., another UE that is neither the transmitting UE nor the receiving UE). Based at least in part on the respective RSRP levels, the receiving UE may determine signal to interference ratios (SIRs) for communications with the transmitting UE and the interfering UE and may determine whether the SIRs indicate that reliable communication between the transmitting UE and the receiving UE is possible on a resource reserved by the interfering UE.

Based at least in part on sensing that the first resource and the second resource are reserved in the subsequent transmission window, the transmitting UE may reserve a third resource in the transmitting window and subsequently transmit to the receiving UE using the third resource in the transmitting window. Similarly, based at least in part on receiving a binary report indicating whether a resource is available or not available (from the receiving UE), the transmitting UE may reserve the third resource in the transmitting window and subsequently transmit to the receiving UE.

As indicated above, FIG. 5 is provided as an example. Other examples may differ from what is described with respect to FIG. 5.

However, the receiving UE may unnecessarily mark a resource as reserved when providing a binary report to the transmitting UE. For example, when the transmitting UE has a packet, such as a high priority packet or a low latency packet, among other examples, the transmitting UE may be configured to transmit the packet even when there is a possibility of interference on a resource reserved by, for example, an interfering UE. In this case, the transmitting UE may determine that the possibility of interference is outweighed by the priority level or the latency level assigned to the packet. Similarly, the transmitting UE may have a plurality of available power control levels, and may be capable of adjusting a power control level to ensure reliable transmission even on a resource that is reserved by an interfering UE. However, when the transmitting UE receives a binary report regarding an availability of a resource, the binary report may lack information to enable the UE to make a decision regarding whether to override a resource reservation and transmit despite a possibility of interference or adjust a power control level to ensure reliability, among other examples.

Some aspects described herein enable enhanced reporting regarding resource availability. For example, the receiving UE may transmit an n-bit report that includes soft resource availability information (e.g., n>2 different levels of resource availability using n>1 bit for identifying an availability of each resource). As an example of a 2-bit report, the receiving UE may transmit a report identifying a resource as strongly available (e.g., not reserved), weakly available (e.g., reserved but with respective SIRs identifying a first threshold level of reliability), weakly not available (e.g., reserved with respective SIRs identifying a second, lower threshold level of reliability), and strongly not available (e.g., reserved and not to be interfered with). Although some aspects are described herein in terms of a 2-bit report with a particular set of availability statuses, other quantities of bits or other sets of availability statuses are possible for the n-bit report.

In this case, the transmitting UE may use the n-bit report to determine whether a resource is available, is unavailable but the transmitting UE may still attempt to transmit on the resource, or is unavailable and the transmitting UE is not to attempt to transmit on the resource. In this way, the receiving UE and the transmitting UE enable a greater level of flexibility in resource utilization in sidelink communication systems.

Figure 6:
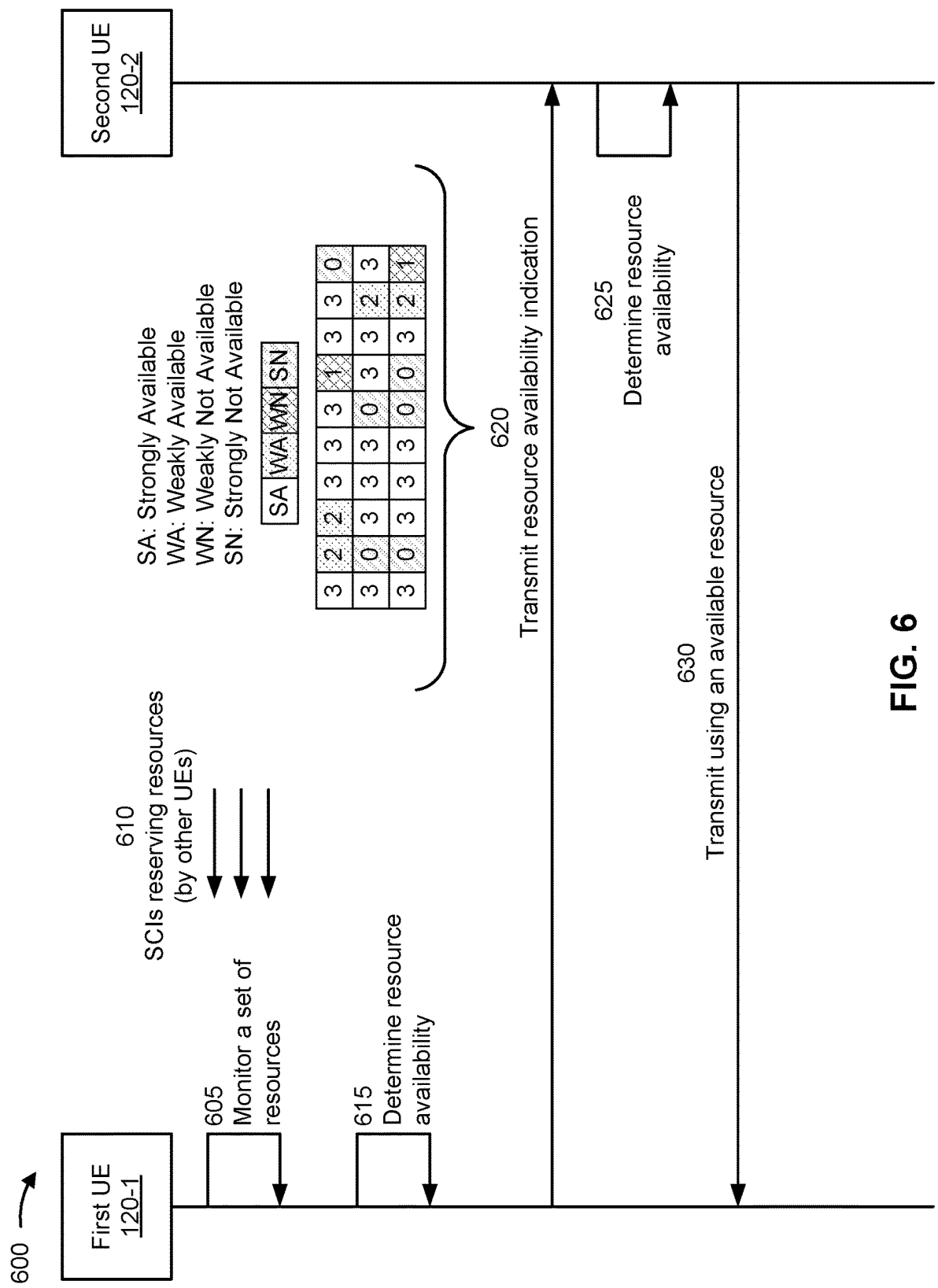
FIG. 6 is a diagram illustrating an example associated with resource availability reporting and utilization, in accordance with the present disclosure.

FIG. 6 is a diagram illustrating an example 600 associated with resource availability information reporting and utilization, in accordance with various aspects of the present disclosure. As shown in FIG. 6, a first UE 120-1 (e.g., a receiving UE) and a second UE 120-2 (e.g., a transmitting UE) may communicate with one another.

As further shown in FIG. 6, and by reference numbers 605 and 610, first UE 120-1 may monitor a set of resources in a sensing window to attempt to decode one or more SCIs reserving one or more resources. For example, first UE 120-1 may receive an SCI, in the sensing window, and decode the SCI to identify a resource reservation (e.g., by an interfering UE (not shown)) in a transmission window. In some aspects, first UE 120-1 may perform a partial sensing and may obtain partial resource availability information. In this case, first UE 120-1 may estimate a resource availability based at least in part on the partial sensing.

As further shown in FIG. 6, and by reference numbers 615 and 620, first UE 120-1 may determine a resource available of a set of resources and may transmit a resource availability indication to identify the resource available. For example, first UE 120-1 may determine a non-binary resource availability status (e.g., a resource availability status with a granularity greater than a binary status) and may transmit an n-bit (n≥2 for each resource) resource availability report to identify the non-binary resource availability status. In this case, first UE 120-1 may encode the availability status for each resource as a value for an n-bit field, such as for a 2-bit indicator encoding a value of 0 ('00') as strongly not available (SN), 1 ('01') as weakly not available (WN), 2 ('10') as weakly available (WA), and 3 ('11') as strongly available (SA). Additionally, or alternatively, first UE 120-1 may encode the availability status using a 3 or more bit indicator to enable another set of possible availability statuses. In some aspects, n, the quantity of bits for each resource, may be greater than 1. In some aspects, n, the quantity of bits may be less than a threshold amount, such as less than 3, less than 5, less than 9, less than 17, less than 33, or less than 65, among other examples.

In some aspects, first UE 120-1 may select a particular value for n (e.g., a quantity of bits to use to identify the availability status of each resource and a level of granularity for the availability status, where $2^n$ represents a quantity of possible statuses for a resource when using n bits to identify the availability status of the resource). For example, first UE 120-1 may select a pre-configured (e.g., static value) for n when determining and reporting the availability status. Additionally, or alternatively, first UE 120-1 may receive an indication from second UE 120-2 requesting a particular level of granularity and corresponding value for n. For example, second UE 120-2 may request that first UE 120-1 provide the resource availability indication (e.g., a report request) and may include, in the request, information identifying a value for n. Additionally, or alternatively, first UE 120-1 may dynamically determine the value for n based at least in part on a quantity of RSRP measurements configured by second UE 120-2 and/or a BS 110 that configures communication for first UE 120-1. In some aspects, first UE 120-1 may dynamically determine the value for n and report the value for n that second UE 120-1 is to use to second UE 120-2 to enable second UE 120-2 to decode the resource availability indication.

In some aspects, the particular value for n may be based at least in part on a parameter configured for first UE 120-1. For example, first UE 120-1 and/or second UE 120-2 may determine the particular value for n based at least in part on a quantity of MCS levels used by second UE 120-2, a quantity of priority levels of packets transmitted by second UE 120-2, a latency requirement (e.g., a packet delay budget (PDB)) configured for second UE 120-2, a reliability requirement of second UE 120-2, or a configuration of power control levels used by second UE 120-2. Additionally, or alternatively, first UE 120-1 and/or second UE 120-2 may determine the particular value for n based at least in part on a quantity of subchannels occupied for resource availability reporting, a communication range requirement of first UE 120-1 and/or second UE 120-2, a physical distance or radio frequency (RF) distance between first UE 120-1 and second UE 120-2, or respective zone identifiers of first UE 120-1 and second UE 120-2, among other examples. Additionally, or alternatively, first UE 120-1 and/or second UE 120-2 may determine the particular value for n based at least in part on a communication type that second UE 120-2 is to use (e.g., unicast, groupcast, multicast, or broadcast communication), a CBR measured by first UE 120-1 and/or second UE 120-2, or whether second UE 120-2 is configured to use HARQ feedback for transmission, among other examples.

In some aspects, first UE 120-1 may generate soft availability information (e.g., an n-bit resource availability status) for a resource based at least in part on an SIR. For example, as described above, first UE 120-1 may determine an estimated SIR of a target link with second UE 120-2 in connection with interfering transmissions from one or more other UEs. In this case, first UE 120-1 may use one or more thresholds to determine an n-bit resource availability status. In some aspects, the one or more thresholds may be RSRP thresholds, RSSI thresholds, or RSRQ thresholds, among other examples.

In some aspects, first UE 120-1 may estimate availability information. For example, when first UE 120-1 performs a partial sensing, such as a sensing associated with a subset of resources, first UE 120-1 may estimate an availability for a set of resources that includes the subset of resources based at least in part on results of the partial sensing, a predictive technique, a pattern recognition technique, or an artificial intelligence technique, among other examples.

In some aspects, first UE 120-1 may compress the n-bit resource availability status. For example, first UE 120-1 may compress a set of bits of the availability information using a source coding technique or another type of compression technique. In this case, first UE 120-1 may represent the n-bit resource availability status for a set of m resources using fewer than n*m bits.

As further shown in FIG. 6, and by reference number 625, second UE 120-2 may use the resource availability information to determine whether to use a particular resource to transmit information. For example, second UE 120-2 may select a resource for transmission based at least in part on an n-bit resource availability status. In some aspects, second UE 120-2 may select the resource based at least in part on the n-bit resource availability status and a parameter. For example, for a relatively high MCS index, second UE 120-2 may determine that a weakly unavailable resource is unavailable, but for a relatively low MCS index, second UE 120-2 may determine that the weakly unavailable resource is available for selection. Similarly, for a relatively low transmit power level, second UE 120-2 may only select a resource that is strongly available, but at a higher transmit power level, second UE 120-2 may select a resource that is weakly available or weakly unavailable. Similarly, second UE 120-2 may determine whether to use a resource for transmission based at least in part on the n-bit resource availability status and a priority level of a packet, or a latency requirement (e.g., a PDB), a reliability requirement, among other examples. Additionally, or alternatively, second UE 120-2 may determine whether to use a resource based at least in part on a communication range requirement, a distance, a radio frequency distance, a zone identifier, a communication type, a CBR, or a utilization of HARQ feedback, among other examples.

In some aspects, second UE 120-2 may combine a plurality of granularities of resource availability information to determine whether to select a resource. For example, second UE 120-2 may map first n-bit availability information to second m-bit availability information (e.g., where m is different than n). In this case, second UE 120-2 may use the more granular of the respective availability information (e.g., the greater of m or n) when there is information regarding a resource in the more granular of the respective availability information. In contrast, when the more granular of the respective availability information does not include information regarding a resource, second UE 120-2 may fall back to using the less granular of the respective availability information. In some cases, one of the m-bit availability information and the n-bit availability information may be information generated by second UE 120-2 based at least in part on performing sensing, and the other may be information received from first UE 120-1. In this case, second UE 120-2 may use information generated based at least in part on performing sensing and fall back to information received from first UE 120-1.

In some aspects, second UE 120-2 may combine the plurality of granularities of resource availability information using a particular logical combination technique. For example, second UE 120-2 may use a logical combination (e.g., AND) operation to combine respective resource availability information. Additionally, or alternatively, second UE 120-2 may average the respective resource availability information for each resource. In some aspects, second UE 120-2 may use a threshold for the combination. For example, second UE 120-2 may identify, as available, only resources with a minimum availability level in both of the respective resource availability information sets or in a single of the respective resource availability information sets. In this case, second UE 120-2 may determine the threshold based at least in part on a static value or a percentage of resources marked as available at a particular threshold value, among other examples. Additionally, or alternatively, second UE 120-2 may adjust a threshold with which a resource availability information set is generated (e.g., an RSRP threshold, an RSRQ threshold, or an SIR threshold) based at least in part on, for example, a percentage of resources marked as available. In this way, second UE 120-2 may ensure that a minimum amount of resources in a transmission window are identified as available to, for example, satisfy a latency requirement, a PDB, or a reliability requirement, among other examples.

In some aspects, second UE 120-2 may determine a resource availability from compressed resource availability information. For example, second UE 120-2 may use stored information regarding a source coding technique, used to compress the resource availability information, to decompress the resource availability information. Additionally, or alternatively, second UE 120-2 may use information received from first UE 120-1 and/or another device to decompress the resource availability information. In some aspects, second UE 120-2 may use a particular decompression technique to extract the resource availability information, such as a source coding-based decompression technique or another type of decompression technique.

As further shown in FIG. 6, and by reference number 630, second UE 120-2 may transmit using a resource. For example, based at least in part on identifying a resource availability of a set of resources, second UE 120-2 may select and/or reserve a resource and transmit using the resource. In some aspects, second UE 120-2 may select the resource based at least in part on a random selection procedure. For example, second UE 120-2 may randomly or pseudo-randomly select any resource marked as strongly available or weakly available. Additionally, or alternatively, second UE 120-2 may apply a weighting toward resources based at least in part on availability statuses. For example, second UE 120-2 may weight strongly available resources more heavily than weakly available resources to increase a likelihood of selecting strongly available resources using a weighted random selection procedure.

As indicated above, FIG. 6 is provided as an example. Other examples may differ from what is described with respect to FIG. 6.

Figure 7:
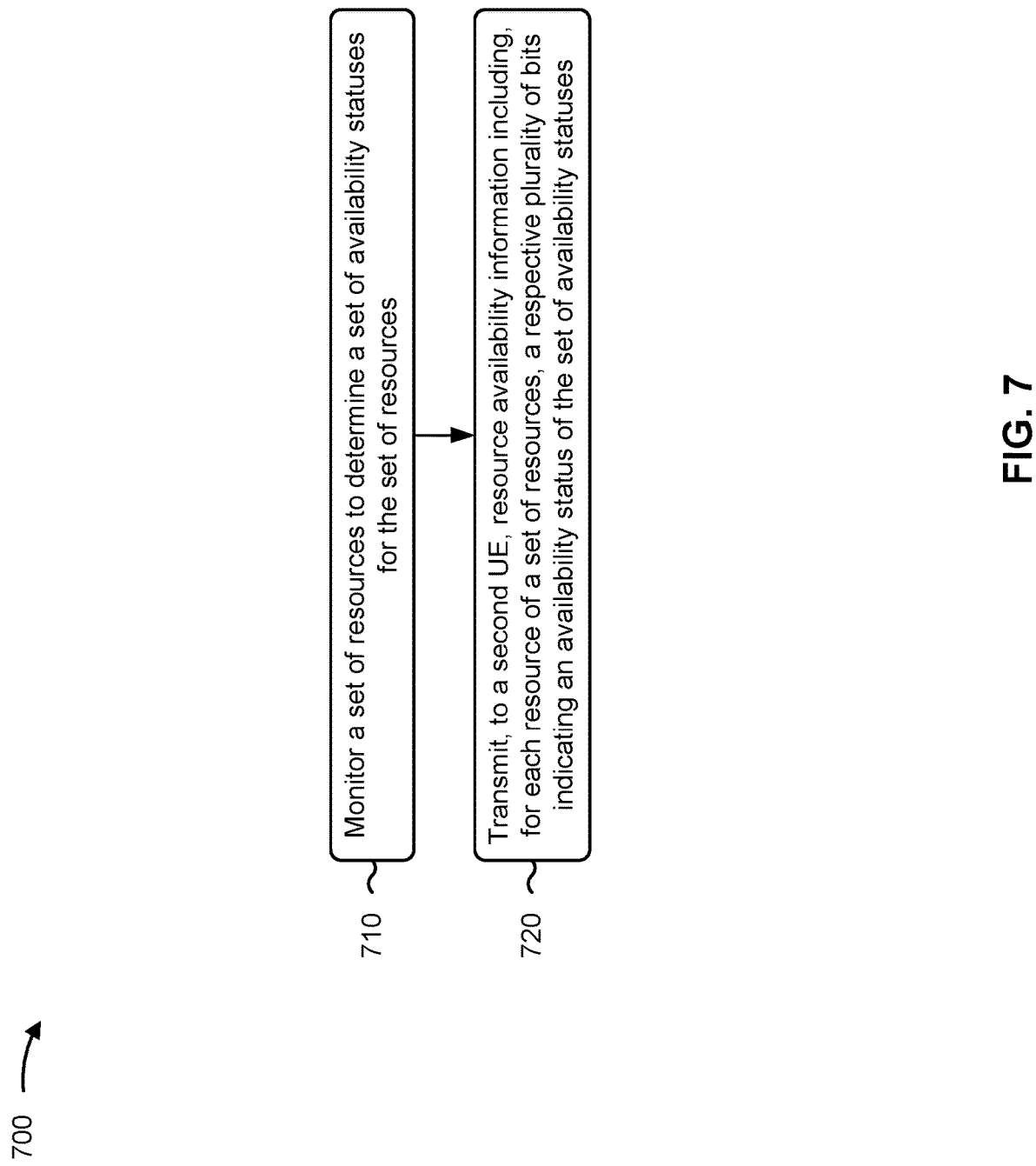
FIGS. 7-8 are diagrams illustrating example processes associated with resource availability reporting and utilization, in accordance with the present disclosure.

FIG. 7 is a diagram illustrating an example process 700 performed, for example, by a first UE, in accordance with various aspects of the present disclosure. Example process 700 is an example where the first UE (e.g., a UE 120) performs operations associated with resource availability information reporting and utilization.

As shown in FIG. 7, in some aspects, process 700 may include monitoring a set of resources to determine a set of availability statuses for the set of resources (block 710). For example, the first UE (e.g., using monitoring component 908, depicted in FIG. 9) may monitor a set of resources to determine a set of availability statuses for the set of resources, as described above.

As further shown in FIG. 7, in some aspects, process 700 may include transmitting, to a second UE, resource availability information including, for each resource of a set of resources, a respective plurality of bits indicating an availability status of the set of availability statuses (block 720). For example, the first UE (e.g., using transmission component 904, depicted in FIG. 9) may transmit, to a second UE, resource availability information including, for each resource of a set of resources, a respective plurality of bits indicating an availability status of the set of availability statuses, as described above.

Process 700 may include additional aspects, such as any single aspect or any combination of aspects described below and/or in connection with one or more other processes described elsewhere herein.

In a first aspect, process 700 includes receiving, from the second UE and based at least in part on transmitting the resource availability information to the second UE, a communication that uses at least one of the set of resources.

In a second aspect, alone or in combination with the first aspect, the respective plurality of bits indicating the availability status of the respective resource comprises a two bit soft resource availability indication identifying whether the respective resource is classified as strongly available, weakly available, weakly not available, or strongly not available.

In a third aspect, alone or in combination with one or more of the first and second aspects, a quantity of bits in the respective plurality of bits is set based at least in part on a static configuration for the first UE, a dynamic indication from the second UE requesting transmission of the resource availability information, a dynamic determination associated with at least one reference signal received power measurement or reference signal received quality measurement, or a dynamic determination reported by the second UE.

In a fourth aspect, alone or in combination with one or more of the first through third aspects, a quantity of bits in the respective plurality of bits is adjusted from a set value based at least in part on a quantity of modulation and coding scheme layers, a quantity of priority levels of packets, a latency parameter, a reliability parameter, a quantity of occupied subchannels, a quantity of power control levels, a communication range parameter, a distance between the first UE and the second UE, a zone identifier, a type of communication, a channel busy ratio, or a utilization of hybrid automatic repeat request feedback.

In a fifth aspect, alone or in combination with one or more of the first through fourth aspects, process 700 includes determining the set of availability statuses based at least in part on a signal to interference ratio on a target link with the second UE.

In a sixth aspect, alone or in combination with one or more of the first through fifth aspects, the signal to interference ratio is based at least in part on a reference signal received power or a reference signal received quality measurement.

In a seventh aspect, alone or in combination with one or more of the first through sixth aspects, the respective plurality of bits indicating the availability status comprises an n-bit resource availability indication identifying whether the resource is classified as one of a plurality of possible availability statuses, wherein n>1.

In an eighth aspect, alone or in combination with one or more of the first through seventh aspects, process 700 includes compressing bits of the resource availability information is compressed using a source coding technique; and transmitting the resource availability information based at least in part on compressing the bits of the resource availability information is compressed using the source coding technique.

In a ninth aspect, alone or in combination with one or more of the first through eighth aspects, process 700 includes determining the set of availability statuses based at least in part on a partial sensing of the set of resources during the monitoring of the set of resources; and transmitting the resource availability information based at least in part on determining the set of availability statuses.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
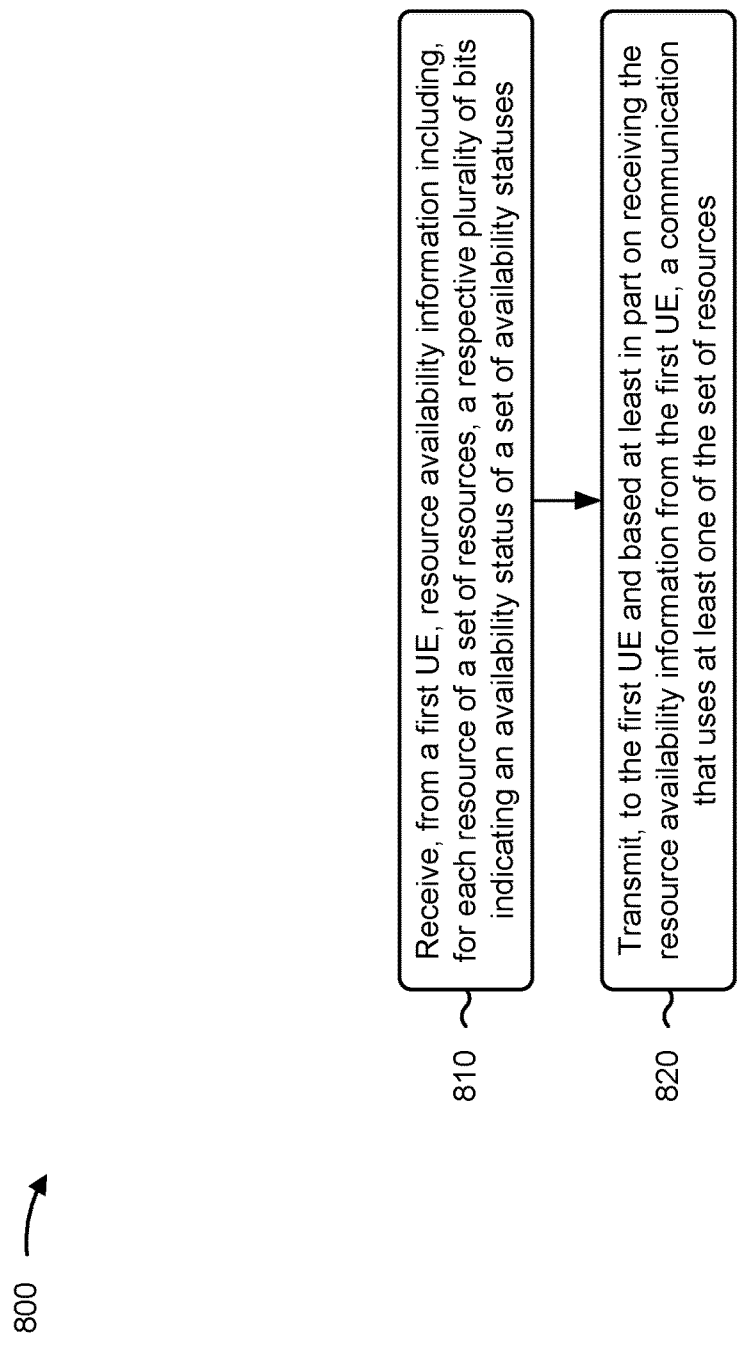

FIG. 8 is a diagram illustrating an example process 800 performed, for example, by a second UE, in accordance with various aspects of the present disclosure. Example process 800 is an example where the second UE (e.g., a UE 120)

performs operations associated with resource availability information reporting and utilization.

As shown in FIG. 8, in some aspects, process 800 may include receiving, from a first UE, resource availability information including, for each resource of a set of resources, a respective plurality of bits indicating an availability status of a set of availability statuses (block 810). For example, the second UE (e.g., using reception component 902, depicted in FIG. 9) may receive, from a first UE, resource availability information including, for each resource of a set of resources, a respective plurality of bits indicating an availability status of a set of availability statuses, as described above.

As further shown in FIG. 8, in some aspects, process 800 may include transmitting, to the first UE and based at least in part on receiving the resource availability information from the first UE, a communication that uses at least one of the set of resources (block 820). For example, the second UE (e.g., using transmission component 904, depicted in FIG. 9) may transmit, to the first UE and based at least in part on receiving the resource availability information from the first UE, a communication that uses at least one of the set of resources, as described above.

Process 800 may include additional aspects, such as any single aspect or any combination of aspects described below and/or in connection with one or more other processes described elsewhere herein.

In a first aspect, the respective plurality of bits indicating the availability status of the respective resource comprises a two bit soft resource availability indication identifying whether the respective resource is classified as strongly available, weakly available, weakly not available, or strongly not available.

In a second aspect, alone or in combination with the first aspect, a quantity of bits in the respective plurality of bits is set based at least in part on a static configuration for the first UE, a dynamic indication from the second UE requesting transmission of the resource availability information, a dynamic determination associated with at least one reference signal received power measurement, or a dynamic determination reported by the second UE.

In a third aspect, alone or in combination with the first through second aspects, a quantity of bits in the respective plurality of bits is adjusted from a set value based at least in part on a quantity of modulation and coding scheme layers, a quantity of priority levels of packets, a latency parameter, a reliability parameter, a quantity of occupied subchannels, a quantity of power control levels, a communication range parameter, a distance between the first UE and the second UE, a zone identifier, a type of communication, a channel busy ratio, or a utilization of hybrid automatic repeat request feedback.

In a fourth aspect, alone or in combination with the first through third aspects, process 800 includes determining the at least one of the set of resources based at least in part on at least one of a modulation and coding scheme index, a priority level, a latency parameter, a reliability parameter, a quantity of power control levels, a communication range parameter, a distance between the first UE and the second UE, a type of communication, a channel busy ratio, or a utilization of hybrid automatic repeat request feedback.

In a fifth aspect, alone or in combination with the first through fourth aspects, the resource availability information is an n-bit report with a first granularity, and further comprising determining the at least one of the set of resources based at least in part on a mapping of the n-bit report to an m-bit report with a second granularity that is different from the first granularity.

In a sixth aspect, alone or in combination with the first through fifth aspects, process 800 includes combining the n-bit report with the m-bit report using a logical conjunction operator or an averaging procedure, and wherein determining the at least one of the set of resources comprises determining the at least one of the set of resources based at least in part on combining the n-bit report with the m-bit report.

In a seventh aspect, alone or in combination with the first through sixth aspects, determining the at least one of the set of resources comprises determining the at least one of the set of resources based at least in part on a configurable threshold ratio of available resources to total resource in a resource pool.

In an eighth aspect, alone or in combination with the first through second seventh, determining the at least one of the set of resources comprises applying a weighting to one or more of the set of resources to select the at least one of the set of resources.

In a ninth aspect, alone or in combination with the first through eighth aspects, process 800 includes decompressing bits of the resource availability information that are compressed using a source coding technique; and determining the at least one of the set of resources comprises based at least in part on decompressing the bits of the resource availability information.

In a tenth aspect, alone or in combination with the first through ninth aspects, the respective plurality of bits indicating the availability status comprises an n-bit resource availability indication identifying whether the resource is classified as one of a plurality of possible availability statuses, wherein n>1.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
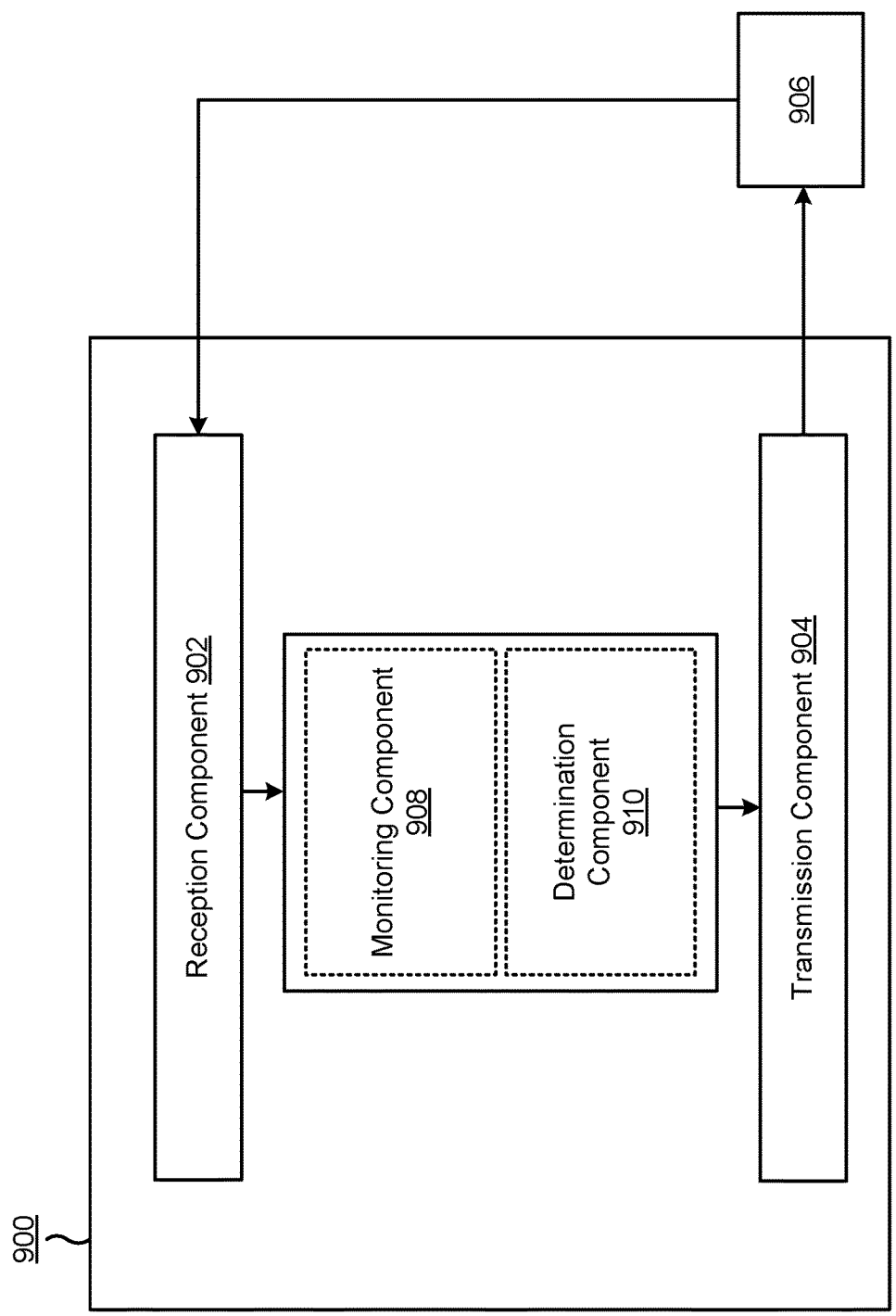
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a monitoring component 908 or a determination component 910, among other examples.

In some aspects, the apparatus 900 may be configured to perform one or more operations described herein in connection with FIG. 4. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The monitoring component 908 may monitor a set of resources to determine a set of availability statuses for the set of resources. The transmission component 904 may transmit, to the apparatus 906, resource availability information including, for each resource of a set of resources, a respective plurality of bits indicating an availability status of the set of availability statuses. The reception component 902 may receive, from the second UE and based at least in part on transmitting the resource availability information to the second UE, a communication that uses at least one of the set of resources. The determination component 910 may determine the set of availability statuses based at least in part on a signal to interference ratio on a target link with the second UE.

The reception component 902 may receive, from the apparatus 906, resource availability information including, for each resource of a set of resources, a respective plurality of bits indicating an availability status of a set of availability statuses. The transmission component 904 may transmit, to the apparatus 906 and based at least in part on receiving the resource availability information from the apparatus 906, a communication that uses at least one of the set of resources.

The determination component 910 may determine the at least one of the set of resources based at least in part on at least one of a modulation and coding scheme index, a priority level, a latency parameter, a reliability parameter, a quantity of power control levels, a communication range parameter, a distance between the apparatus 900 and the apparatus 906, a type of communication, a channel busy ratio, or a utilization of hybrid automatic repeat request feedback. The determination component 910 may determine the at least one of the set of resources based at least in part on a mapping of the n-bit report to an m-bit report with a second granularity that is different from the first granularity. The determination component 910 may combine the n-bit report with the m-bit report using a logical conjunction operator or an averaging procedure and may determine the at least one of the set of resources based at least in part on combining the n-bit report with the m-bit report. The determination component 910 may applying a weighting to one or more of the set of resources to select the at least one of the set of resources. The determination component 910 may compress bits of the resource availability information using a source coding technique. The determination component 910 may decompress bits of the resource availability information using a source coding technique. The determination component 910 may determine the resource availability information based at least in part on a partial sensing of resource availability.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first user equipment (UE), comprising: monitoring a set of resources to determine a set of availability statuses for the set of resources; and transmitting, to a second UE, resource availability information including, for each resource of a set of resources, a respective plurality of bits indicating an availability status of the set of availability statuses.

Aspect 2: The method of Aspect 1, further comprising: receiving, from the second UE and based at least in part on transmitting the resource availability information to the second UE, a communication that uses at least one of the set of resources.

Aspect 3: The method of any of Aspects 1 to 2, wherein the respective plurality of bits indicating the availability status of a resource comprises a two bit soft resource availability indication identifying whether the resource is classified as: strongly available, weakly available, weakly not available, or strongly not available.

Aspect 4: The method of any of Aspects 1 to 3, wherein a quantity of bits in the respective plurality of bits is set based at least in part on: a static configuration for the first UE, a dynamic indication from the second UE requesting transmission of the resource availability information, a dynamic determination associated with at least one reference signal received power measurement or reference signal received quality measurement, or a dynamic determination reported by the second UE.

Aspect 5: The method of any of Aspects 1 to 4, wherein a quantity of bits in the respective plurality of bits is adjusted from a set value based at least in part on: a quantity of modulation and coding scheme layers, a quantity of priority levels of packets, a latency parameter, a reliability parameter, a quantity of occupied subchannels, a quantity of power control levels, a communication range parameter, a distance between the first UE and the second UE, a zone identifier, a type of communication, a channel busy ratio, or a utilization of hybrid automatic repeat request feedback.

Aspect 6: The method of any of Aspects 1 to 5, further comprising: determining the set of availability statuses based at least in part on a signal to interference ratio on a target link with the second UE.

Aspect 7: The method of Aspect 6, wherein the signal to interference ratio is based at least in part on a reference signal received power or a reference signal received quality measurement.

Aspect 8: The method of any of Aspects 1 to 7, wherein the respective plurality of bits indicating the availability status comprises an n-bit resource availability indication identifying whether the resource is classified as one of a plurality of possible availability statuses, wherein n>1.

Aspect 9: The method of any of Aspects 1 to 8, further comprising: compressing bits of the resource availability information is compressed using a source coding technique; and wherein transmitting the resource availability information comprises: transmitting the resource availability information based at least in part on compressing the bits of the resource availability information is compressed using the source coding technique.

Aspect 10: The method of any of Aspects 1 to 9, further comprising: determining the set of availability statuses based at least in part on a partial sensing of the set of resources during the monitoring of the set of resources; and wherein transmitting the resource availability information comprises: transmitting the resource availability information based at least in part on determining the set of availability statuses.

Aspect 11: A method of wireless communication performed by a second user equipment (UE), comprising: receiving, from a first UE, resource availability information including, for each resource of a set of resources, a respective plurality of bits indicating an availability status of a set of availability statuses; and transmitting, to the first UE and based at least in part on receiving the resource availability information from the first UE, a communication that uses at least one of the set of resources.

Aspect 12: The method of Aspect 11, wherein the respective plurality of bits indicating the availability status of a resource comprises a two bit soft resource availability indication identifying whether the resource is classified as: strongly available, weakly available, weakly not available, or strongly not available.

Aspect 13: The method of any of Aspects 11 to 12, wherein a quantity of bits in the respective plurality of bits is set based at least in part on: a static configuration for the first UE, a dynamic indication from the second UE requesting transmission of the resource availability information, a dynamic determination associated with at least one reference signal received power measurement, or a dynamic determination reported by the second UE.

Aspect 14: The method of any of Aspects 11 to 13, wherein a quantity of bits in the respective plurality of bits is adjusted from a set value based at least in part on: a quantity of modulation and coding scheme layers, a quantity of priority levels of packets, a latency parameter, a reliability parameter, a quantity of occupied subchannels, a quantity of power control levels, a communication range parameter, a distance between the first UE and the second UE, a zone identifier, a type of communication, a channel busy ratio, or a utilization of hybrid automatic repeat request feedback.

Aspect 15: The method of any of Aspects 11 to 14, further comprising: determining the at least one of the set of resources based at least in part on at least one of: a modulation and coding scheme index, a priority level, a latency parameter, a reliability parameter, a quantity of power control levels, a communication range parameter, a distance between the first UE and the second UE, a type of communication, a channel busy ratio, or a utilization of hybrid automatic repeat request feedback.

Aspect 16: The method of any of Aspects 11 to 15, wherein the resource availability information is an n-bit report with a first granularity, and further comprising: determining the at least one of the set of resources based at least in part on a mapping of the n-bit report to an m-bit report with a second granularity that is different from the first granularity.

Aspect 17: The method of Aspect 16, further comprising: combining the n-bit report with the m-bit report using a logical conjunction operator or an averaging procedure; and wherein determining the at least one of the set of resources comprises: determining the at least one of the set of resources based at least in part on combining the n-bit report with the m-bit report.

Aspect 18: The method of any of Aspects 16 to 17, wherein determining the at least one of the set of resources comprises: determining the at least one of the set of resources based at least in part on a configurable threshold ratio of available resources to total resource in a resource pool.

Aspect 19: The method of any of Aspects 16 to 17, wherein determining the at least one of the set of resources comprises: applying a weighting to one or more of the set of resources to select the at least one of the set of resources.

Aspect 20: The method of any of Aspects 11 to 19, further comprising: decompressing bits of the resource availability information that are compressed using a source coding technique; and wherein determining the at least one of the set of resources comprises: determining the at least one of the set of resources comprises based at least in part on decompressing the bits of the resource availability information.

Aspect 21: The method of Aspect 11, wherein the respective plurality of bits indicating the availability status comprises an n-bit resource availability indication identifying whether the resource is classified as one of a plurality of possible availability statuses, wherein n>1.

Aspect 22: An apparatus for wireless communication at a device, comprising a processor; memory coupled with the processor; and instructions stored in the memory and executable by the processor to cause the apparatus to perform the method of one or more of Aspects 1-10.

Aspect 23: A device for wireless communication, comprising a memory and one or more processors coupled to the memory, the one or more processors configured to perform the method of one or more of Aspects 1-10.

Aspect 24: An apparatus for wireless communication, comprising at least one means for performing the method of one or more of Aspects 1-10.

Aspect 25: A non-transitory computer-readable medium storing code for wireless communication, the code comprising instructions executable by a processor to perform the method of one or more of Aspects 1-10.

Aspect 26: A non-transitory computer-readable medium storing a set of instructions for wireless communication, the set of instructions comprising one or more instructions that, when executed by one or more processors of a device, cause the device to perform the method of one or more of Aspects 1-10.

Aspect 27: An apparatus for wireless communication at a device, comprising a processor; memory coupled with the processor; and instructions stored in the memory and executable by the processor to cause the apparatus to perform the method of one or more of Aspects 11-21.

Aspect 28: A device for wireless communication, comprising a memory and one or more processors coupled to the memory, the one or more processors configured to perform the method of one or more of Aspects 11-21.

Aspect 29: An apparatus for wireless communication, comprising at least one means for performing the method of one or more of Aspects 11-21.

Aspect 30: A non-transitory computer-readable medium storing code for wireless communication, the code comprising instructions executable by a processor to perform the method of one or more of Aspects 11-21.

Aspect 31: A non-transitory computer-readable medium storing a set of instructions for wireless communication, the set of instructions comprising one or more instructions that, when executed by one or more processors of a device, cause the device to perform the method of one or more of Aspects 11-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
a memory; and
one or more processors, coupled to the memory, configured to:
monitor a set of resources to determine a set of availability statuses for the set of resources; and
transmit, to a second UE, resource availability information including, for each resource of a set of resources, a respective plurality of bits indicating a non-binary availability status of the set of availability statuses, the non-binary availability status comprising a granularity greater than a binary availability status.

2. The first UE of claim 1, wherein the one or more processors are further configured to:
receive, from the second UE and based at least in part on transmitting the resource availability information to the second UE, a communication that uses at least one of the set of resources.

3. The first UE of claim 1, wherein the respective plurality of bits indicating the non-binary availability status of a resource comprises a two bit soft resource availability indication identifying whether the resource is classified as:
strongly available,
weakly available,
weakly not available, or
strongly not available.

4. The first UE of claim 1, wherein a quantity of bits in the respective plurality of bits is set based at least in part on:
a static configuration for the first UE,
a dynamic indication from the second UE requesting transmission of the resource availability information,
a dynamic determination associated with at least one reference signal received power measurement or reference signal received quality measurement, or
a dynamic determination reported by the second UE.

5. The first UE of claim 1, wherein a quantity of bits in the respective plurality of bits is adjusted from a set value based at least in part on:
a quantity of modulation and coding scheme layers,
a quantity of priority levels of packets,
a latency parameter,
a reliability parameter,
a quantity of occupied subchannels,
a quantity of power control levels,
a communication range parameter,
a distance between the first UE and the second UE,
a zone identifier,
a type of communication,
a channel busy ratio, or
a utilization of hybrid automatic repeat request feedback.

6. The first UE of claim 1, wherein the one or more processors are further configured to:
determine the set of availability statuses based at least in part on a signal to interference ratio on a target link with the second UE.

7. The first UE of claim 6, wherein the signal to interference ratio is based at least in part on a reference signal received power or a reference signal received quality measurement.

8. The first UE of claim 1, wherein the respective plurality of bits indicating the non-binary availability status comprises an n-bit resource availability indication identifying whether the resource is classified as one of a plurality of possible availability statuses, wherein n>1.

9. The first UE of claim 1, wherein the one or more processors are further configured to:
compress bits of the resource availability information is compressed using a source coding technique; and
wherein the one or more processors, to transmit the resource availability information, are configured to:
transmit the resource availability information based at least in part on compressing the bits of the resource availability information is compressed using the source coding technique.

10. The first UE of claim 1, wherein the one or more processors are further configured to:
determine the set of availability statuses based at least in part on a partial sensing of the set of resources during the monitoring of the set of resources; and
wherein the one or more processors, to transmit the resource availability information, are configured to:
transmit the resource availability information based at least in part on determining the set of availability statuses.

11. A second user equipment (UE) for wireless communication, comprising:
a memory; and
one or more processors, coupled to the memory, configured to:
receive, from a first UE, resource availability information including, for each resource of a set of resources, a respective plurality of bits indicating a non-binary availability status of a set of availability statuses, the non-binary availability status comprising a granularity greater than a binary availability status; and
transmit, to the first UE and based at least in part on receiving the resource availability information from the first UE, a communication that uses at least one of the set of resources.

12. The second UE of claim 11, wherein the respective plurality of bits indicating the non-binary availability status of a resource comprises a two bit soft resource availability indication identifying whether the resource is classified as:
strongly available,
weakly available,
weakly not available, or
strongly not available.

13. The second UE of claim 11, wherein a quantity of bits in the respective plurality of bits is set based at least in part on:
a static configuration for the first UE,
a dynamic indication from the second UE requesting transmission of the resource availability information,
a dynamic determination associated with at least one reference signal received power measurement, or
a dynamic determination reported by the second UE.

14. The second UE of claim 11, wherein a quantity of bits in the respective plurality of bits is adjusted from a set value based at least in part on:
a quantity of modulation and coding scheme layers,
a quantity of priority levels of packets,
a latency parameter,
a reliability parameter,
a quantity of occupied subchannels,
a quantity of power control levels,
a communication range parameter,
a distance between the first UE and the second UE,
a zone identifier,
a type of communication,
a channel busy ratio, or
a utilization of hybrid automatic repeat request feedback.

15. The second UE of claim 11, wherein the one or more processors are further configured to:
determine the at least one of the set of resources based at least in part on at least one of:
a modulation and coding scheme index,
a priority level,
a latency parameter,
a reliability parameter,
a quantity of power control levels,
a communication range parameter,
a distance between the first UE and the second UE,
a type of communication,
a channel busy ratio, or
a utilization of hybrid automatic repeat request feedback.

16. The second UE of claim 11, wherein the resource availability information is an n-bit report with a first granularity, and further comprising:
determine the at least one of the set of resources based at least in part on a mapping of the n-bit report to an m-bit report with a second granularity that is different from the first granularity.

17. The second UE of claim 16, wherein the one or more processors are further configured to:
combine the n-bit report with the m-bit report using a logical conjunction operator or an averaging procedure; and wherein the one or more processors, to determine the at least one of the set of resources, are configured to:
determine the at least one of the set of resources based at least in part on combining the n-bit report with the m-bit report.

18. The second UE of claim 16, wherein the one or more processors, to determine the at least one of the set of resources, are configured to:
determine the at least one of the set of resources based at least in part on a configurable threshold ratio of available resources to total resource in a resource pool.

19. The second UE of claim 16, wherein the one or more processors, to determine the at least one of the set of resources, are configured to:
apply a weighting to one or more of the set of resources to select the at least one of the set of resources.

20. The second UE of claim 11, wherein the one or more processors are further configured to:
decompress bits of the resource availability information that are compressed using a source coding technique; and
wherein the one or more processors, to determine the at least one of the set of resources, are configured to:
determine the at least one of the set of resources comprises based at least in part on decompressing the bits of the resource availability information.

21. The second UE of claim 11, wherein the respective plurality of bits indicating the non-binary availability status comprises an n-bit resource availability indication identifying whether the resource is classified as one of a plurality of possible availability statuses, wherein n>1.

22. A method of wireless communication performed by a first user equipment (UE), comprising:
monitoring a set of resources to determine a set of availability statuses for the set of resources; and
transmitting, to a second UE, resource availability information including, for each resource of a set of resources, a respective plurality of bits indicating a non-binary availability status of the set of availability statuses, the non-binary availability status comprising a granularity greater than a binary availability status.

23. The method of claim 22, further comprising:
receiving, from the second UE and based at least in part on transmitting the resource availability information to the second UE, a communication that uses at least one of the set of resources.

24. The method of claim 22, wherein the respective plurality of bits indicating the non-binary availability status of a resource comprises a two bit soft resource availability indication identifying whether the resource is classified as:
strongly available,
weakly available,
weakly not available, or
strongly not available.

25. The method of claim 22, wherein a quantity of bits in the respective plurality of bits is set based at least in part on:
a static configuration for the first UE,
a dynamic indication from the second UE requesting transmission of the resource availability information,
a dynamic determination associated with at least one reference signal received power measurement or reference signal received quality measurement, or
a dynamic determination reported by the second UE.

26. The method of claim 22, wherein a quantity of bits in the respective plurality of bits is adjusted from a set value based at least in part on:
a quantity of modulation and coding scheme layers,
a quantity of priority levels of packets,
a latency parameter,
a reliability parameter,
a quantity of occupied subchannels,
a quantity of power control levels,
a communication range parameter,
a distance between the first UE and the second UE,
a zone identifier,
a type of communication,
a channel busy ratio, or
a utilization of hybrid automatic repeat request feedback.

27. A method of wireless communication performed by a second user equipment (UE), comprising:
receiving, from a first UE, resource availability information including, for each resource of a set of resources, a respective plurality of bits indicating a non-binary availability status of a set of availability statuses, the non-binary availability status comprising a granularity greater than a binary availability status; and
transmitting, to the first UE and based at least in part on receiving the resource availability information from the first UE, a communication that uses at least one of the set of resources.

28. The method of claim 27, wherein the respective plurality of bits indicating the non-binary availability status of a resource comprises a two bit soft resource availability indication identifying whether the resource is classified as:
strongly available,
weakly available,
weakly not available, or
strongly not available.

29. The method of claim 27, wherein a quantity of bits in the respective plurality of bits is set based at least in part on:
a static configuration for the first UE,
a dynamic indication from the second UE requesting transmission of the resource availability information,
a dynamic determination associated with at least one reference signal received power measurement, or
a dynamic determination reported by the second UE.

30. The method of claim 27, wherein a quantity of bits in the respective plurality of bits is adjusted from a set value based at least in part on:
a quantity of modulation and coding scheme layers,
a quantity of priority levels of packets,
a latency parameter,
a reliability parameter,
a quantity of occupied subchannels,
a quantity of power control levels,
a communication range parameter,
a distance between the first UE and the second UE,
a zone identifier,
a type of communication,
a channel busy ratio, or
a utilization of hybrid automatic repeat request feedback.

* * * * *